United States Patent
Howard et al.

(10) Patent No.: US 8,380,122 B2
(45) Date of Patent: Feb. 19, 2013

(54) SIGNAL BLANKING FOR IMPROVED FREQUENCY DOMAIN CHANNEL ESTIMATION

(75) Inventors: Steven J. Howard, Ashland, MA (US); Tadeusz Jarosinski, San Diego, CA (US); Dhananjay Ashok Gore, San Diego, CA (US); Gwendolyn Denise Barriac, Encinitas, CA (US); Michael Mao Wang, San Diego, CA (US); Tao Tian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 385 days.

(21) Appl. No.: 12/708,318

(22) Filed: Feb. 18, 2010

(65) Prior Publication Data

US 2010/0285738 A1  Nov. 11, 2010

Related U.S. Application Data

(60) Provisional application No. 61/177,196, filed on May 11, 2009.

(51) Int. Cl.
*H04B 3/36* (2006.01)
*H04B 7/14* (2006.01)

(52) U.S. Cl. ............ 455/7; 455/11.1; 455/24; 370/315; 375/211

(58) Field of Classification Search ............ 455/9, 7, 455/63.1, 11.1, 12.1, 509, 24, 22, 114.2, 455/115.1, 14–18; 370/252, 241, 315, 318, 370/332, 328, 316; 375/211, 213, 350
See application file for complete search history.

(56) References Cited

U.S. PATENT DOCUMENTS

| | | | |
|---|---|---|---|
| 5,930,293 A | 7/1999 | Light et al. | |
| 6,385,435 B1 | 5/2002 | Lee | |
| 7,406,295 B1 | 7/2008 | Yarkosky | |
| 7,480,486 B1 | 1/2009 | Oh et al. | |
| 2002/0039383 A1 | 4/2002 | Zhu et al. | |
| 2002/0172184 A1 | 11/2002 | Kim et al. | |
| 2003/0206579 A1 | 11/2003 | Bryant | |
| 2004/0203911 A1 | 10/2004 | Masuda et al. | |
| 2005/0227619 A1 | 10/2005 | Lee et al. | |
| 2006/0014491 A1* | 1/2006 | Cleveland | 455/17 |
| 2006/0019603 A1 | 1/2006 | Pergal | |
| 2006/0040611 A1* | 2/2006 | Ding et al. | 455/11.1 |
| 2006/0205343 A1 | 9/2006 | Runyon et al. | |

(Continued)

FOREIGN PATENT DOCUMENTS

| EP | 0772310 A2 | 5/1997 |
|---|---|---|
| EP | 0851606 A2 | 7/1998 |

(Continued)

OTHER PUBLICATIONS

International Search Report and Written Opinion—PCT/US2010/034384—International Search Authority, European Patent Office, Jan. 21, 2011.

(Continued)

*Primary Examiner* — Sujatha Sharma
(74) *Attorney, Agent, or Firm* — Linda G. Gunderson (57) ABSTRACT

A wireless repeater includes a channel estimation block to estimate a feedback channel between the antennas of the repeater using frequency domain channel estimation. The repeater includes a pilot signal blanking circuit to blank out a selected number of samples of the pilot signal to improve the accuracy of the channel estimation. In another embodiment, the repeater replaces T samples of the pilot signal with a cyclic prefix.

27 Claims, 6 Drawing Sheets

U.S. PATENT DOCUMENTS

| | | |
|---|---|---|
| 2008/0019314 A1 | 1/2008 | Gorokhov et al. |
| 2008/0113617 A1 | 5/2008 | Braithwaite |
| 2008/0137788 A1 | 6/2008 | Bang et al. |
| 2008/0176513 A1* | 7/2008 | Braithwaite et al. ............ 455/24 |
| 2008/0205661 A1* | 8/2008 | Kim et al. ...................... 381/66 |
| 2008/0261519 A1 | 10/2008 | DeMarco et al. |
| 2009/0061766 A1* | 3/2009 | Ding et al. .................. 455/11.1 |
| 2010/0118922 A1 | 5/2010 | Ahn |
| 2010/0284445 A1 | 11/2010 | Barriac et al. |
| 2010/0285733 A1 | 11/2010 | Gore et al. |
| 2010/0285734 A1 | 11/2010 | Black et al. |
| 2010/0285735 A1 | 11/2010 | Gore et al. |
| 2010/0285736 A1 | 11/2010 | Gore et al. |
| 2011/0002367 A1 | 1/2011 | Kummetz |

FOREIGN PATENT DOCUMENTS

| | | |
|---|---|---|
| EP | 1566900 A2 | 8/2005 |
| EP | 2053812 A2 | 4/2009 |
| KR | 1020080081785 A | 9/2008 |
| WO | WO2007034449 A2 | 3/2007 |
| WO | WO2009014281 A1 | 1/2009 |

OTHER PUBLICATIONS

Lee, M., et al. "An Interference Cancellation Scheme for Mobile Communication Radio Repeaters", IEICE Transactions on Communications, Communications Society, Tokyo, JP, vol. E92-B, No. 5, May 1, 2009, pp. 1778-1785, XP001547676.

* cited by examiner

SIGNAL BLANKING FOR IMPROVED FREQUENCY DOMAIN CHANNEL ESTIMATION

CROSS-REFERENCE TO RELATED APPLICATIONS

This application claims the benefit of U.S. Provisional Patent Application Ser. No. 61/177,196, filed on May 11, 2009, which application is incorporated herein by reference in its entirety.

BACKGROUND

1. Field

This disclosure generally relates to repeaters in wireless communication systems, and in particular, to a method and apparatus for feedback delay control in an echo cancellation repeater.

2. Background

Wireless communication systems and techniques have become an important part of the way we communicate. However, providing coverage can be a significant challenge to wireless service providers. One way to extend coverage is to deploy repeaters.

Figure 1:
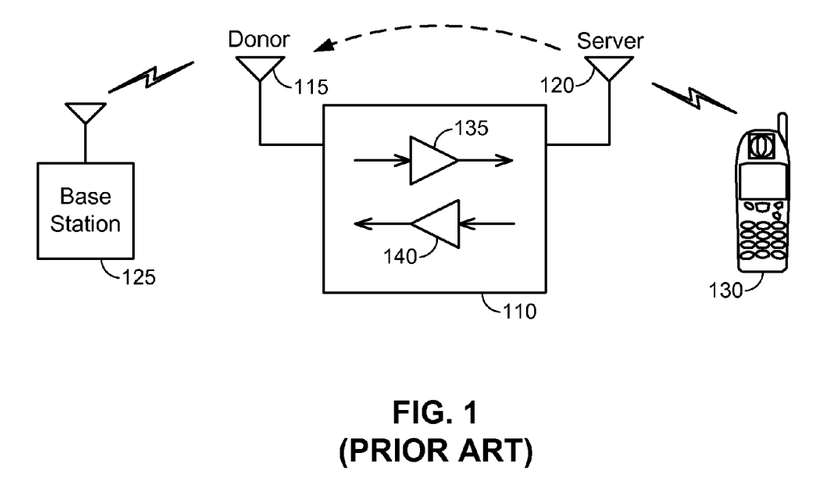
FIG. 1 is a simplified diagram of a repeater according to the prior art.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. According to one embodiment of the present invention, a method for estimating a feedback channel for a wireless repeater in a wireless communication system is described. The wireless repeater has a first antenna and a second antenna to receive a receive signal and transmit an amplified signal and the receive signal is a sum of a remote signal to be repeated and a feedback signal resulting from the feedback channel between the first and second antenna of the wireless repeater. The method includes estimating the feedback channel between the first antenna and the second antenna using frequency domain channel estimation and using a signal indicative of the amplified signal as a pilot signal, grouping samples of the pilot signal into blocks of N samples, N being the size of the fast Fourier transform (FFT) operation performed for the frequency domain channel estimation, blanking K samples of the pilot signal in each block of N samples, K being much less than N, and generating a feedback channel estimate using blocks of N samples of the pilot signal, each block of N samples including K blanked samples, and blocks of N samples of the receive signal.

According to another aspect of the present invention, a wireless repeater having a first antenna and a second antenna to receive a receive signal and transmit an amplified signal is described where the receive signal is a sum of a remote signal to be repeated and a feedback signal resulting from a feedback channel between the first antenna and the second antenna. The wireless repeater includes receive circuitry configured to receive the receive signal from one of the first antenna and the second antenna, an echo canceller configured to access a feedback signal estimate and to cancel the feedback signal estimate from the receive signal, a delay element configured to introduce a first delay before or after the echo canceller, and transmit circuitry configured to amplify the delayed echo cancelled signal to generate the amplified signal to be transmitted. The echo canceller includes a channel estimation block configured to estimate the feedback channel using frequency domain channel estimation and using a signal indicative of the amplified signal as a pilot signal. The frequency domain channel estimation is operative to perform a fast Fourier transform (FFT) on blocks of N samples of the pilot signal, N being the size of the FFT operation. The echo canceller further includes a pilot signal blanking circuit configured to blank K samples of the pilot signal in each block of N samples, K being much less than N. The channel estimation block is configured to generate a feedback channel estimate using blocks of N samples of the pilot signal, each block of N samples including K blanked samples, and blocks of N samples of the receive signal. The channel estimation block further generates the feedback signal estimate based on the feedback channel estimate.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may be more difficult to obtain the desired isolation between the repeater's antennas. Moreover, in some traditional repeater implementations, the target is to achieve as high a gain as reasonable while maintaining a stable feedback loop (loop gain less than unity). However, increasing the repeater gain renders isolation more difficult due to the increased signal leaking back into the donor antenna. In general, loop stability demands require that the signal leaking back into the donor antenna from the coverage antenna be much lower than the remote signal (the signal to be repeated). The maximum achievable signal to interference/noise ratio (SINR) at the output of the repeater is then the same as the SINR of the remote signal at the input to the repeater. High gain and improved isolation form two demands required for modern day repeaters, especially those for indoor applications.

Systems and techniques herein provide for wireless repeaters with improved isolation between the repeaters' donor antenna ("the receiving antenna" for the example of a forward link transmission) and the coverage antenna ("the transmitting antenna" for forward link transmissions). Furthermore, in some embodiments, systems and techniques herein provide for a unique repeater design employing interference cancellation or echo cancellation to significantly improve the isolation. In some embodiments, the interference cancellation and echo cancellation are realized using improved channel estimation techniques provided herein for accurate estimation of the channel. Effective echo cancellation requires very accurate channel estimation of the leakage channel. In general, the more accurate the channel estimate, the higher the cancellation and hence the higher the effective isolation. Herein, "interference cancellation" or "echo cancellation" refers to techniques that reduce or eliminate the amount of leakage signal between the repeater's antennas; that is, "interference cancellation" refers to cancellation of an estimated leakage signal, which provides for partial or complete cancellation of the actual leakage signal.

Figure 2:
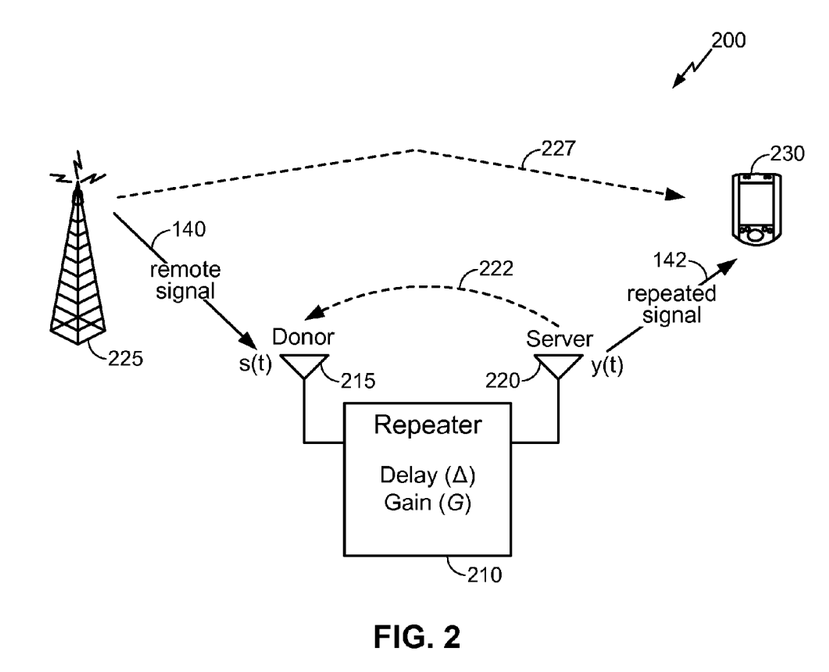
FIG. 2 shows a diagram of a repeater environment according to some embodiments of the current disclosure.

FIG. 2 shows a diagram of an operating environment 200 for a repeater 210 according to embodiments of the current disclosure. The example of FIG. 2 illustrates forward link transmissions; i.e., a remote signal 140 from a base station 225 is intended for a mobile device 230. A repeater, such as repeater 210, may be used in environment 200 if an unrepeated signal along the path 227 between base station 225 and mobile device 230 would not provide sufficient signal for effective voice and/or data communications received at mobile device 230. Repeater 210 with a gain G and a delay $\Delta$ is configured to repeat a signal received from base station 225 on a donor antenna 215 to mobile device 230 using a server antenna 220. Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where $y(t)=\sqrt{G}s(t-\Delta)$. Ideally, the gain G would be large, the inherent delay $\Delta$ of the repeater would be small, the input SNR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay $\Delta$. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

In embodiments of the present invention, a repeater suitable for indoor coverage (e.g., business, residential, or similar use) is provided. The repeater has an active gain of about 70 dB or greater which is an example of a sufficient gain for coverage in a moderately sized residence. Furthermore, the repeater has a loop gain of less than one for stability (loop gain being referred to as the gain of the feedback loop between the transmitting antenna and the receiving antenna) and a sufficient amount of margin for stability and low output noise floor. In some embodiments, the repeater has a total isolation of greater than 80 dB. In some embodiments, the repeater employs interference/echo cancellation to achieve a high level of active isolation, which is significantly more challenging than the requirements of available repeaters.

Some embodiments of the present invention utilize channel estimation to enable the required level of echo cancellation. By estimating the feedback channel (the channel between the antennas) to a sufficient degree of accuracy, the residual error, post echo cancellation, can be sufficiently below the remote signal to realize the desired loop gain margin for stability.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Channel Estimation Techniques

Accurate channel estimation is important for high fidelity baseband cancellation of the leakage signal in on-frequency repeaters. In a typical repeater, the pilot signal for channel estimation is the amplified signal being amplified and transmitted to the mobile device (downlink or forward link) or to the base station (uplink or reverse link). The amplified signal leaks back from the transmitting antenna to the receiving antenna in both forward or reverse link transmissions. The leakage signal, also referred to as the feedback signal, is received by the receiving antenna together with the desired remote signal. In an interference cancellation repeater, the feedback signal is estimated and then cancelled out. Interference cancellation increases the effective isolation between the repeater's antennas. If the feedback channel is estimated sufficiently accurately, the feedback signal can be almost completely subtracted out. The more accurate the channel estimate, the more amplification of the output signal the repeater can sustain while maintaining the required isolation for stability. In other words, the accuracy of the repeater's channel estimate and the repeater's achievable gain are directly related.

According to one aspect of the present invention, an echo cancellation repeater implements channel estimation in the frequency domain. Frequency domain channel estimation provides particular advantages such as reduced complexity and increased robustness. However, frequency domain channel estimation through the use of Fast Fourier Transform-Inverse Fast Fourier Transform (FFT-IFFT) type processing typically relies on a cyclic prefix in the signal for maintaining orthogonality. The problem with applying frequency domain channel estimation in repeater applications is that the "pilot" is really just the signal to be transmitted (i.e., the original signal from the base station/mobile unit) and there is no inserted cyclic prefix in the "pilot" signal to ensure orthogonality of the different "frequency bins". Lack of a cyclic prefix, or equivalently having a channel that is longer that the cyclic prefix, is well known to introduce error terms in the channel estimation, including additive errors such as inter-sample interference (ISI) and inter-carrier interference (ICI) and multiplicative errors, hence degrading the performance of the channel estimation.

Systems and methods of the present invention provided herein enable the use of frequency domain channel estimation in an echo cancellation repeater in the absence of a cyclic prefix in the pilot signal which is the transmitted signal. More specifically, systems and methods of the present invention provided herein improve the accuracy of frequency domain channel estimation in an echo cancellation repeater through pilot samples blanking.

Figure 3:
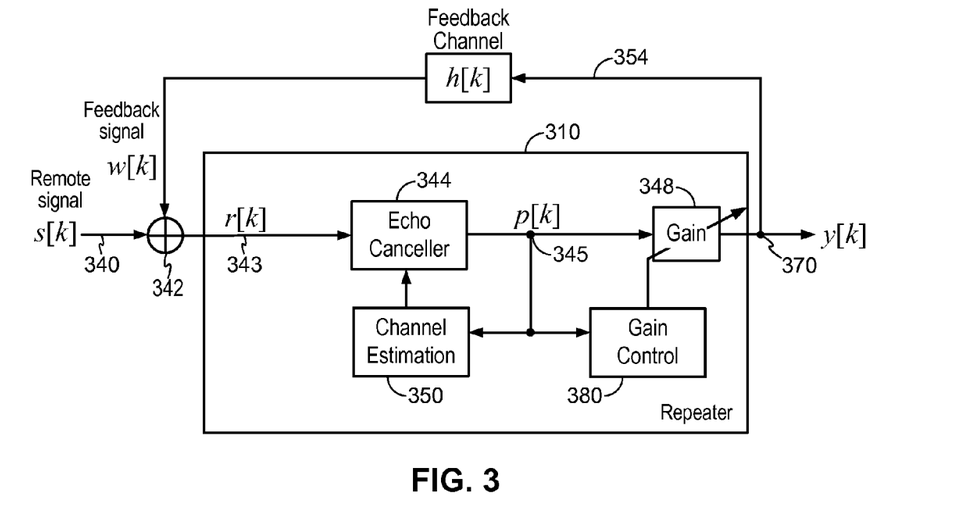
FIG. 3 is a block diagram of an echo-cancellation repeater in which the pilot sample blanking method can be implemented according to one embodiment of the present invention.

FIG. 3 is a block diagram of an echo-cancellation repeater in which the pilot sample blanking method can be implemented according to one embodiment of the present invention. Referring to FIG. 3, an echo-cancellation repeater 310 receives a remote signal s[k] to be repeated on a donor antenna (denoted as input node 340) and generates an output signal y[k] to be transmitted on a server antenna (denoted as output node 370). Signal leakage from the server antenna back to the donor antenna causes part of the output signal y[k] to be leaked back and added to the remote signal before being received by the repeater. The signal leakage is represented as a feedback channel h[k], denoted as a signal path 354 between output node 370 and the input node 340. Thus, repeater 310 actually receives as an input on a node 343 a receive signal r[k] being the sum of the remote signal s[k] and the feedback signal w[k]. A summer 342 in FIG. 3 is symbolic only and included to illustrate the signal components of receive signal r[k] and does not represent an actual signal summer in the operating environment of repeater 310.

Repeater 310, being an echo-cancellation repeater, operates to estimate the feedback signal w[k] in order to cancel out the undesired feedback signal component in the receive signal. To that end, repeater 310 includes a channel estimation block 350 for estimating the feedback channel h[k] and an echo canceller 344 for estimating the feedback signal and cancelling the estimated feedback signal from the receive signal. More specifically, the receive signal r[k] is coupled to a summer which operates to subtract a feedback signal estimate $\hat{w}[k]$ from the receive signal r[k]. As long as the feedback signal estimate $\hat{w}[k]$ is accurate, the undesired feedback signal is removed from the receive signal and echo cancellation is realized. In the present embodiment, the post cancellation signal p[k] (node 345) is coupled to a variable gain stage 348 providing a gain of G to the post cancellation signal. The gain G provided by gain stage 348 is controlled by a gain control block 380 applying gain control algorithms to maintain the stability of repeater 310. Gain stage 348 generates the output signal y[k] on the output node 370 for transmission on the server antenna.

FIG. 3 illustrates only elements that are relevant to channel estimation operation of the present invention. Repeater 310 may include other elements not shown in FIG. 3 but known in the art to realize the complete repeater operation.

As described above, frequency domain channel estimation in a repeater using FFT-IFFT type processing on a pilot signal without cyclic prefix presents challenges in terms additive noise and multiplicative noise error terms. The additive noise includes ICI and ISI terms which arise because the circular convolution of the FFT-IFFT processing is not equivalent to the desired linear convolution due to the lack of a cyclic prefix in the pilot signal. The multiplicative noise introduces bias to the channel estimate. In general, assume H is the perfect channel estimate of the feedback channel in a repeater, the actual channel estimate as a result of the lack of cyclic prefix becomes: $\alpha H+M+Z$, where M represents random noise, Z is additive noise terms ICI and ISI, and $\alpha$ is the multiplicative noise term. Typically, $\alpha$ is very close to 1 but can affect accuracy in the estimation is $\alpha$ deviates from the value of 1.

More specifically, the channel estimation algorithm resulting in the ICI and ISI errors can be illustrated as follows. Let H denotes the perfect feedback channel estimate, P denotes the fast Fourier transform of the pilot signal: P=FFT(pilot);

and R denotes the fast Fourier transform of the receive signal: R=FFT(rxsignal), the feedback channel estimate $\hat{H}$ is given as:

$$\hat{H} = \frac{P^*R}{P^*P}$$
$$= \frac{P^*(feedbacksignal + remotesignal)}{P^*P}$$
$$= \frac{P^*(HP + remotesignal)}{P^*P} + ICI + ISI$$
$$= H + \frac{P^*remotesignal}{P^*P} + ICI + ISI,$$

where "P*R" denotes conjugate of the P and R, etc.

The use of frequency domain channel estimation in the absence of a cyclic prefix introduces the additive error terms ICI and ISI as shown above. These error terms degrade the accuracy of the channel estimation.

Pilot Sample Blanking

According to a first embodiment of the present invention, a method to eliminate the IC/ISI additive error terms in the frequency domain channel estimate involves blanking out the last K samples of each FFT block in the pilot signal. Blanking out the last K samples of the pilot signal has the effect of making the pilot signal looks like it has a cyclic prefix. In a second embodiment, a cyclic prefix is introduced in place of blanking of the pilot signal to provide the necessary cyclic prefix.

Figure 4:
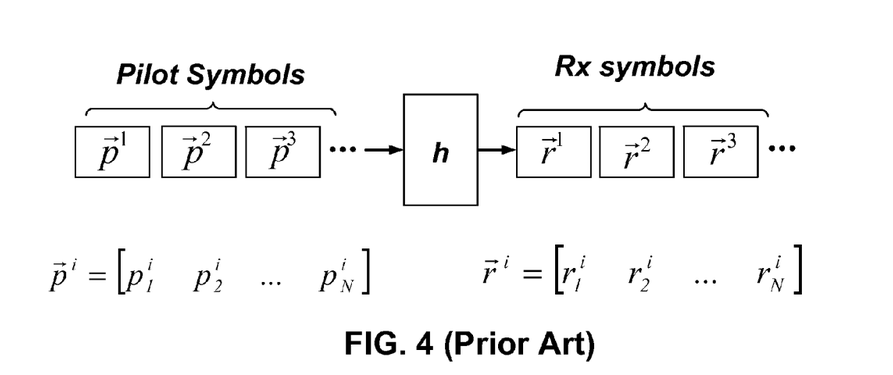
FIG. 4 illustrates the relationship between the receive samples, the pilot samples and the feedback channel in a conventional channel estimation algorithm.

In order to perform frequency domain channel estimation processing, the pilot samples, as well as the receive samples, are grouped in blocks of length N, where N is the size of the FFT being performed on both the pilot samples and the receive samples. The receive samples are assumed to be a circular convolution of the pilot samples and the feedback channel, plus noise and is illustrated in FIG. 4. FIG. 4 illustrates the relationship between the receive samples, the pilot samples and the feedback channel in a conventional channel estimation algorithm. Referring to FIG. 4, the pilot samples $p^i$ are grouped in blocks of N samples and the blocks of N receive samples $r^i$ is assumed to be a circular convolution of the blocks of pilot samples with the feedback channel h. However, because of the lack of cyclic prefix in the pilot signal, the circular convolution of the FFT-IFFT processing is not equivalent to the desired linear convolution and error terms result.

Figure 5:
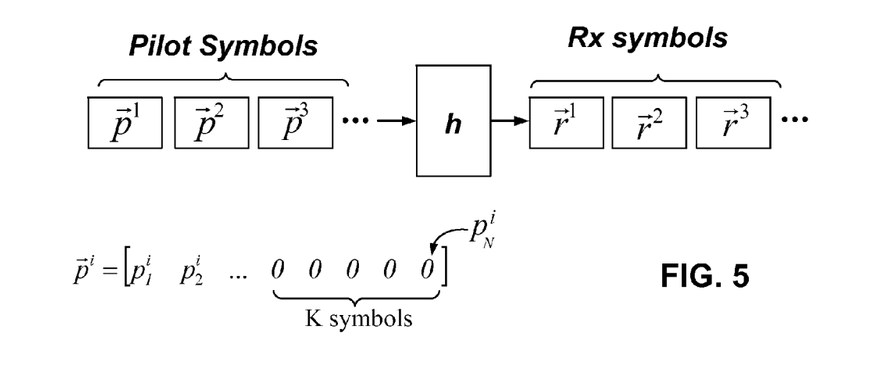
FIG. 5 illustrates the relationship between the receive samples, the pilot samples and the feedback channel in a channel estimation algorithm applying the pilot sample blanking method according to one embodiment of the present invention.

According to one embodiment of the present invention, the last K samples of each N sized block of pilot samples are blanked out to solve the problem of the lack of a cyclic prefix in the pilot signal. FIG. 5 illustrates the relationship between the receive samples, the pilot samples and the feedback channel in a channel estimation algorithm applying the pilot sample blanking method according to one embodiment of the present invention. The blanking of the last K samples occurs before transmission through the channel h. As long as the time span of the K samples is greater than or equal to the time span of the channel, then both the ICI and ISI error terms can be completely eliminated. That is, as long as most of the channel impulse response is contained within K samples, then the convolution of the N-K non-zero samples of the transmitted block with the channel will produce a received signal of duration N samples or less and the ICI and ISI error terms will be eliminated in the channel estimation algorithm computation. The ICI/ISI error term elimination comes at the expense of losing K out of N samples in each FFT block of the pilot signal, but as long as K/N is small enough, this loss is negligible. In one embodiment, K is expected to be small for feedback channels, and hence N does not have to be made prohibitively large in order to keep the ratio of K/N small, such as less than 1%.

As shown in the pictorial representation in FIG. 5, the blanking of the last K samples in each pilot block has the effect of inserting a guard interval in the sample sequence to allow the desired linear convolution to be equivalent to the circular convolution of the FFT-IFFT processing as a result of the blanked sample guardband. By blanking the last K samples of each pilot block, samples from the previous pilot block do not leak into the current receive samples block.

In the present description, blanking out the last K samples in the pilots refers to reducing the energy of the K samples to zero or to a small value near zero. That is, blanking of the K samples does not require the energy level to be reduced to zero entirely. Furthermore, in an alternate embodiment, instead of reducing the energy level to zero instantaneously, the transition to zero energy can be made gradually such that out of band emissions are minimized, as will be described in more detail below.

Figure 6:
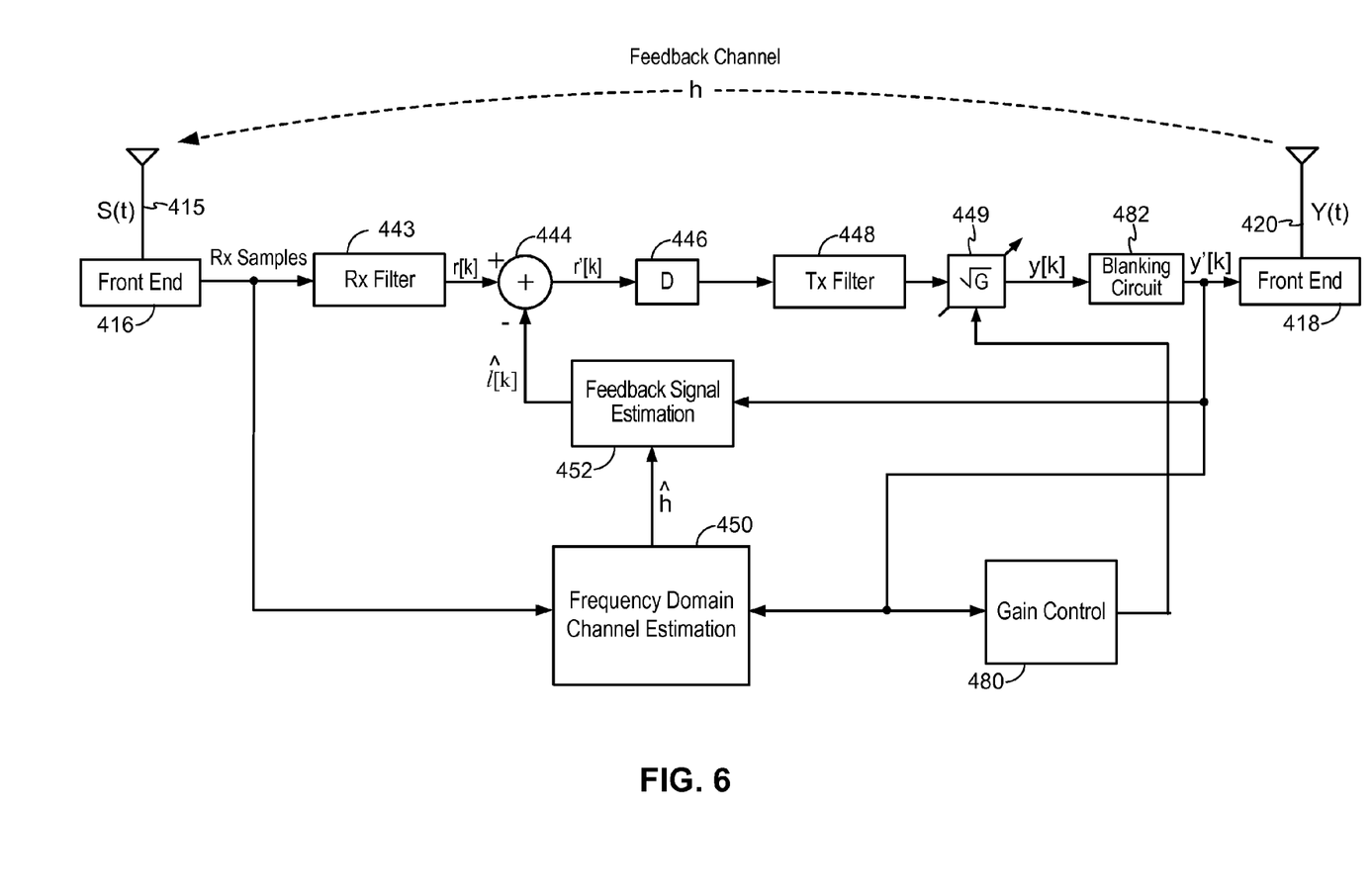
FIG. 6 is a detail block diagram of a repeater in which the pilot sample blanking method can be implemented according to one embodiment of the present invention.

FIG. 6 is a detail block diagram of a repeater in which the pilot sample blanking method can be implemented according to one embodiment of the present invention. Referring to FIG. 6, the remote signal S(t) is received by a donor antenna 415 which is coupled to receive circuitry including a transceiver front end circuit 416 and a receive filter 443. The received samples (Rx samples) from the transceiver front end circuit 416 are coupled to receive filter (Rx filter) 443 and then to an echo canceller including a summer 444 for echo cancellation. The echo cancelled receive signal r'[k] is coupled to a delay element 446 to introduce a desired amount of delay to decorrelate the transmit signal from the remote signal. In other embodiments, delay element 446 can be provided before the echo canceller. The delayed echo cancelled signal is coupled to transmit circuitry including a transmit filter (Tx filter) 448, a gain stage 449 applying a gain of G and a transceiver front end circuit 418. The transmit signal y[k] generated by gain stage 449 is coupled through a blanking circuit 482 to transceiver front end circuit 418 to be processed for transmission as the transmit signal Y(t) on a coverage antenna 420. A gain control block 480 controls the variable gain of gain stage 449.

The transmit signal y'[k] (or y[k]) is used as the pilot signal for the gain control block 480 and a channel estimation block 450. In the present embodiment, the channel estimation block 450 implements frequency domain channel estimation. Channel estimation block 450 also receive the received samples Rx samples and perform channel estimation to generate a feedback channel estimate ĥ. More specifically, channel estimation block 450 generates the feedback channel estimate ĥ using N samples of the pilot signal which includes K blanked samples and N samples of the received samples Rx samples. The feedback channel estimate ĥ is provided to a feedback signal estimation block 452 which, together with the transmit signal y[k], computes a feedback signal estimate Î[k]. The feedback signal estimate Î[k] is provided to summer 444 to be subtracted from the receive signal r[k].

In embodiments of the present invention, channel estimation block 450 generates the feedback channel estimate ĥ using channel estimation techniques presently known or to be developed. In one embodiment, channel estimation block 450 generates the feedback channel estimate ĥ by dividing each FFT block of received samples by the corresponding FFT block of pilot samples and then processing groups of FFT blocks using maximal ratio combining. In other embodiments, other frequency domain channel estimation techniques can be applied.

In embodiments of the present invention, the blanking of the pilot samples from the pilot signal y[k] can occur before or after the transmit filter 448 in the repeater. However, it is more efficient to introduce the blanking of the pilot samples after the transmit filter. In the present embodiment shown in FIG. 6, blanking circuit 482 is placed after the transmit filter 448 to blank out K samples of the transmit signal y[k]. Transmit signal y'[k] is the same as the transmit signal y[k] but with K samples blanked out.

In the present embodiment, the last K samples of each block of N pilot samples are blanked out. In other embodiments, the blanking can be taken from samples from other locations within the block of N pilot samples. However, selecting the last K samples for blanking has particular advantages in that the ICI and ISI error terms, which are inherent in frequency domain approaches without a cyclic prefix, are virtually eliminated as long as most of the channel impulse response is contained within K samples. This allows a significant improvement in the channel estimation, which, in the context of a repeater, in turn allows a significant improvement in the amount of gain achievable. Furthermore, even for a given, fixed gain, if the channel estimate improves, then the output SNR increases (where output SNR is a measure of the noise introduced by the repeater), meaning that the stability margin of the repeater improves. In one exemplary embodiment, when the output SNR is an indicator of system stability, at full repeater gain, the use of blanking at less than 1% of the total energy enables an SNR gain of ~13 dB, from 7 dB to 20 dB. Equivalently, the repeater gain can be increased while maintaining the same output SINR.

According to an alternate embodiment of the present invention, T number of samples in each FFT block of N samples of the pilot signal is discarded and a cyclic prefix is introduced in place of the discarded samples. Accordingly, the FFT size becomes N-T. Although a small amount of data corruption results, a large improvement in channel estimation is obtained with the presence of the cyclic prefix. The cyclic prefix can be added at any location within the block of N-T samples of the pilot signal. However, in a preferred embodiment, the cyclic prefix is added at the beginning of the block of N-T samples of the pilot signal. The exact location of the cyclic prefix is not critical to the practice of the present invention and can be determined by the definition of the FFT operation. The cyclic prefix is inserted before the FFT operation of the channel estimation algorithm.

In one embodiment, the amount of blanking insertion (K samples) or the amount of cyclic prefix insertion (T samples) is determined by balancing the amount of channel estimation improvement obtained and the distortion in the transmitted signal as a result of the inserted samples.

Sample Blanking Using Windowing

When blanking of the pilot samples is implemented in a repeater in accordance with the above-described embodiments, certain side effects results due to the distortion to the signal being repeated. In some cases, blanking of the pilot samples can lead to spectral leakage. According to another aspect of the present invention, pilot sample blanking is applied using a window function to reduce the spectral leakage. A window function is a function in signal processing that is zero-valued or "gated" within a selected interval but otherwise allows samples to pass through "ungated" outside of the selected interval. In one embodiment, a window function used to blank a group of K samples in the pilot signal has a gradual transition from an ungated state (multiplication of 1) to a fully gated state (multiplication by 0 or less than 1) and in reverse. In other embodiments, other windowing profile can be used to transition the samples from the ungated state (1) to the gated state (0) and vice versa. Furthermore, in one embodiment, a Kaiser window is used in the pilot sample blanking method of the present invention to reduce out-of-band spectral leakage to the required level. A Kaiser window refers to a window function with gradual transitions at both ends of the interval. By using a window function to blank out the pilot samples, signal distortion due to the blanking of the pilot samples is reduced to a reasonable level and the SNR is maintained above a desired level, such as 20 dB.

Blanking Circuit With Window Function

Figure 7:
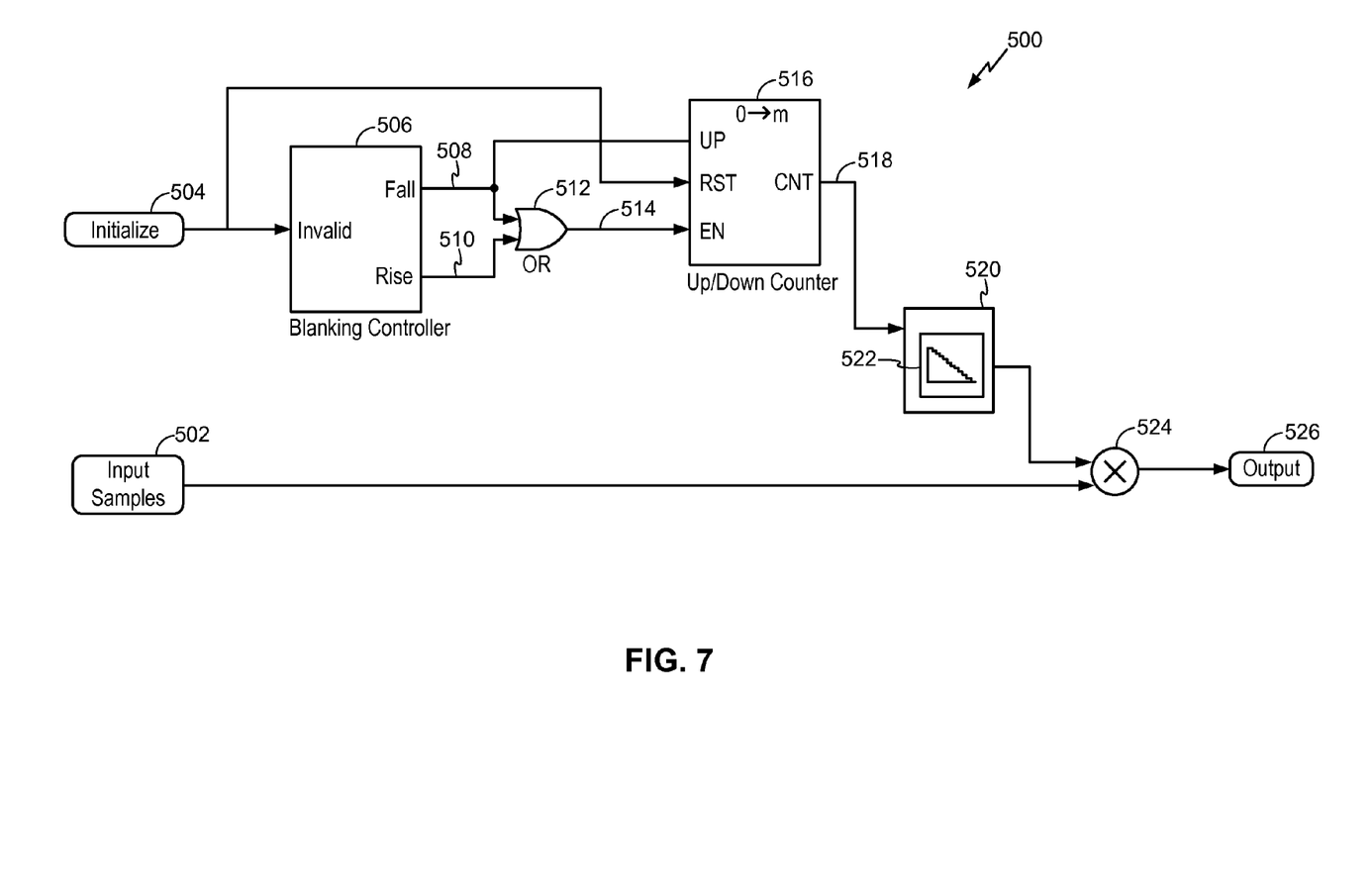
FIG. 7 is a schematic diagram of a blanking circuit which can be applied in the pilot sample blanking method according to one embodiment of the present invention.

FIG. 7 is a schematic diagram of a blanking circuit which can be applied in the pilot sample blanking method according to one embodiment of the present invention. More specifically, the blanking circuit in accordance with the present embodiment of the present invention operates to store the windowing profile in registers or in memory and dynamically switches the windowing profile on and off at calibrated times to align the blanking operation with a certain interval, such as at the end of the FFT block. Referring to FIG. 7, a blanking circuit 500 receives the pilot samples as input samples on an input node 502. The input samples are treated as blocks of samples of size N where N is the size of the FFT being performed on both the pilot samples. The input samples are coupled to a multiplier 524 to be multiplied by a window coefficient. The input samples either passes through multiplier 524 ungated (multiplication of 1) or passes through multiplier 524 gated by the window coefficients (multiplication of less than 1). Multiplier 524 generates the output samples of the blanking circuit 500 on an output node 526. Each block of output samples includes a selected number of samples being blanked out or zeroed out by the window function.

Blanking circuit 500 also receives an initialize signal on an input node 504. The initialize signal indicates the start up or power up of blanking circuit 500. The initialize signal is asserted once to reset blanking circuit 500 for receiving the incoming input samples and determines the beginning (alignment) of the first FFT block. Consecutive FFT blocks are then received back-to-back afterwards. Blanking circuit 500 includes a blanking controller 506, an OR gate 512, an up/down counter 516 and a memory 520. The construction and operation of blanking circuit 500 will be explained with reference to FIG. 8 which is a schematic diagram of the blanking controller 506 according to one embodiment of the present invention, FIG. 9 which is a schematic diagram of the ramp selectors 534 and 536 in blanking controller 506 according to one embodiment of the present invention, and FIG. 10 which is a timing diagram of the signals in blanking circuit 500 according to one embodiment of the present invention. The following description refers to FIGS. 7-10.

Figure 10:
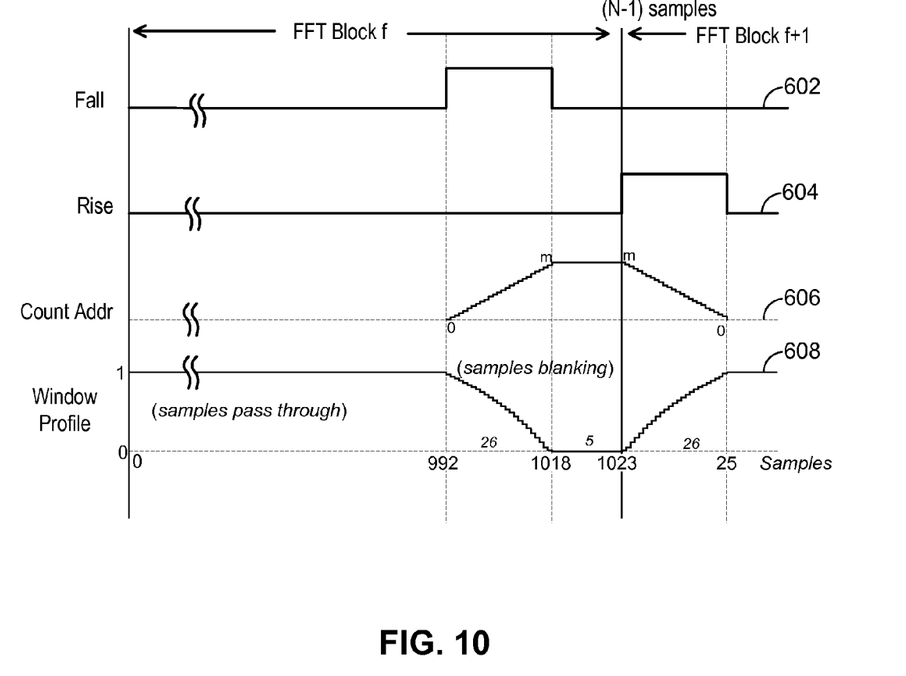
FIG. 10 is a timing diagram of the signals in blanking circuit 500 according to one embodiment of the present invention.

The initialize signal is coupled to a reset input node of blanking controller 506 to reset the blanking controller upon start up or power up, and to align the beginning of the first FFT block. Blanking controller 506 generates a fall signal (node 508) and a rise signal (node 510) indicative of the fall and rise intervals of the blanking window and their positions within the FFT block. Referring to FIG. 10, the fall signal (curve 602) is asserted during an interval when the window profile is activated to decrease the energy of the input samples. In embodiments of the present invention, the energy of the input samples is decreased to zero value or to near zero value during the fall interval. After the fall interval, the input samples are zeroed out for a zero interval until the end of the FFT block. Then, the rise signal (curve 604) is asserted during an interval when the window profile is activated to increase the energy of the input samples back up to the ungated level. The rise interval is provided to restore the energy of the input samples to the ungated level at the start of the next FFT block.

Returning to FIG. 7, in blanking circuit 500, the fall signal and the rise signal are coupled to OR gate 512 to generate an enable signal (node 514) for the up/down counter 516. Thus, when either one of the fall signal or the rise signal is activated, the enable signal to the up/down counter 516 is asserted and counting commences. The up/down counter 516 also receives the fall signal as the count direction indicator (UP). Up/down counter 516 is programmed to count up or down between the values of 0 and m depending on whether the count direction indicator is asserted or deasserted respectively. When counter 516 is enabled and the fall signal is asserted, the up/down counter will count up from 0 to m. When counter 516 is enabled and the fall signal is not asserted, the up/down counter will count down from m to 0. Finally, the up/down counter 516 receives the initialize signal as a reset signal to reset the counter upon start up or power up.

The up/down counter 516 generates a count address output signal (node 518) which is coupled to memory 520. Memory 520 stores the window profile as coefficients in memory locations within the memory. In one embodiment, the window coefficients are stored in registers 522. The window coefficients are retrieved by indexing memory 520 using the count address output signal.

More specifically, during the fall interval (FIG. 10), the count address output signal (curve 606) increments from the initial value of 0 to the final value of m (UP is asserted during the fall interval). The count address output signal retrieves from memory 520 window coefficients associated with a decreasing transitions of the window profile. As a result, memory 520 provides the decreasing coefficients of the window profile to multiplier 524. The decreasing coefficients gate the input samples (node 502) to generate output samples (curve 608) that are transitioned from an ungated state to zero energy level (or near zero energy level) during the fall interval. At the end of the fall interval, the last coefficient remains applied to the multiplier 524 to blank out the input samples throughout the zero interval. Pilot signal blanking is thus realized. The input samples are blanked till the end of the FFT block and at the beginning of the next FFT block, the rise interval begins. During the rise interval, the count address output signal (curve 606) decrements from the final value of m to the initial value of 0 (UP is deasserted during the rise interval) to retrieve from memory 520 window coefficients associated with an increasing transitions of the window profile. As a result, memory 520 provides the increasing coefficients of the window profile to multiplier 524. The increasing coefficients gate the input samples to generate output samples (curve 608) that are transitioned from zero energy level back to being ungated. In the present embodiment, the sample blanking window is applied at the end of the FFT block and is aligned with the input samples so that the energy level of the output samples is blanked through the end of the current FFT block and the energy level is gradually restored to the ungated level at the start of the next FFT block.

Figure 8:
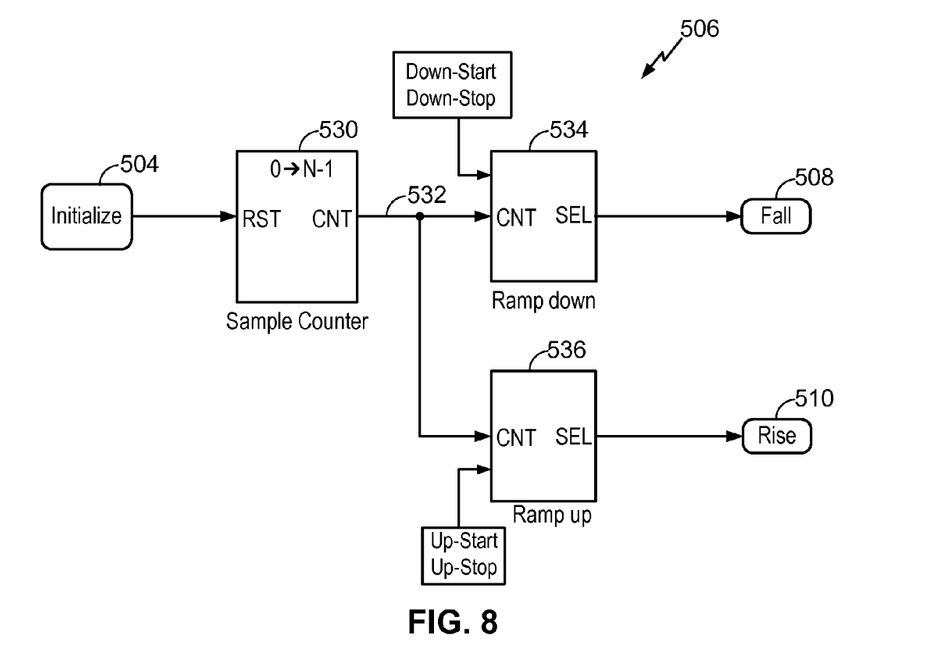
FIG. 8 is a schematic diagram of the blanking controller 506 according to one embodiment of the present invention.

The construction and operation of the blanking controller 506 will now be described with reference to FIG. 8. Blanking controller 506 includes a sample counter 530, a ramp down selector 534 and a ramp up selector 536. The sample counter 530 is reset by the initialize signal (node 504) and once reset, counts repeatedly from a count 0 to a count N−1, where N is the size of the FFT block. Sample counter 530 basically counts the input samples for each block of the FFT operation. The sample count value (node 532) is provided to ramp down selector 534 and ramp up selector 536. Ramp down selector 534 and ramp up selector 536 are each programmed with its own count start/stop values to generate the fall signal (node 508) and the rise signal (node 510) at the desired sample locations.

More specifically, the ramp down selector 534 receives a down-start value and a down-stop value while the ramp up selector 536 receives an up-start value and an up-stop value. The down-start value defines the sample number where the fall interval should start and the down-stop value defines the sample number where the fall interval should stop. The up-start value defines the sample number where the rise interval should start and the up-stop value defines the sample number where the rise interval should stop. In one embodiment, the fall and rise intervals each have a duration of 26 samples (m=0.27; 1.0 for m=0, and 0.0 for m=27). The fall interval starts at sample 993 (down-start value) and ends at sample 1018 (down-stop value). The samples are blanked out during the zero interval from sample 1019 to the last sample 1023 of the FFT block. Then, the rise interval starts at sample 0 (up-start value) and ends at sample 25 (up-stop value) which is the beginning of the next FFT block.

Accordingly, when sample counter 530 is reset, the sample counter increments the sample count value from the reset value of 0. When the sample count value (node 532) reaches the down-start value (e.g. 993), ramp down counter 534 asserts the fall signal (curve 602 in FIG. 10). The fall signal is asserted until the sample count value reaches the down-stop value (e.g. 1019) at which point the fall signal is deasserted. The zero interval continues while the sample count value continues to increment to sample 1023 which is the last sample of the current FFT bock. Then the sample counter 530 returns to count 0 which is the up-start value and the rise signal (curve 604 in FIG. 10) is then asserted at the beginning of the next FFT block. The rise signal is asserted until the sample count value reaches the up-stop value (e.g. 26) at which point the rise signal is deasserted and the input samples pass through ungated. In this manner, the blanking controller 506 generates the fall signal and the rise signal.

Figure 9:
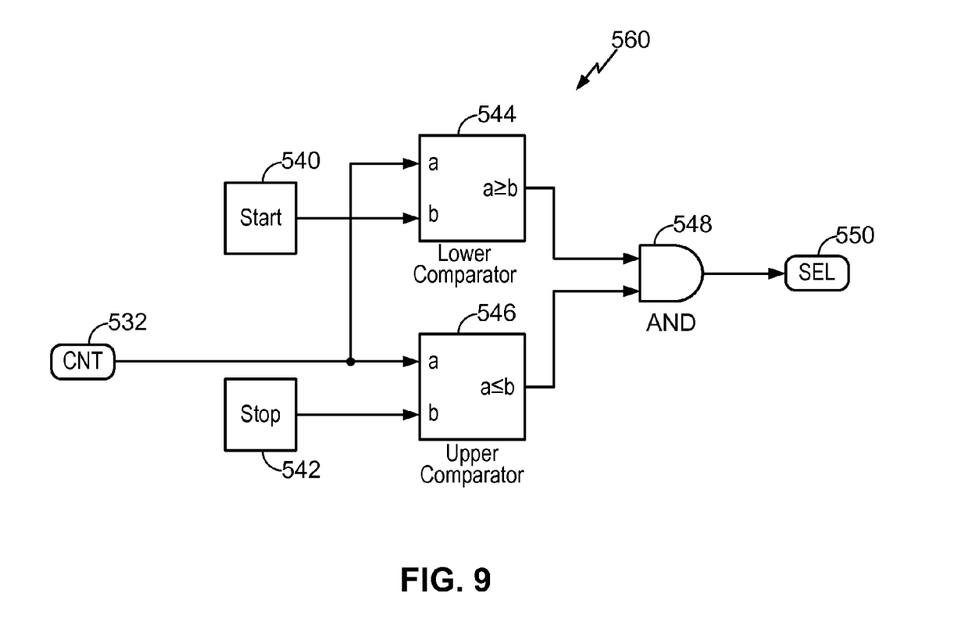
FIG. 9 is a schematic diagram of the ramp counter in blanking controller 506 according to one embodiment of the present invention.

The ramp down selector 534 and the ramp up selector 536 in blanking controller 506 are constructed in identical manner and shown in FIG. 9. Referring to FIG. 9, a ramp selector 560 includes a lower comparator 544, an upper comparator 546 and an AND gate 548. The sample count value (node 532) is coupled to one input of both of the comparators 544, 546. The lower comparator 544 receives the start value (node 540) while the upper comparator 546 receives the stop value (node 542). The lower comparator 544 determines if the sample count value is greater than or equal to the start value. The upper comparator 546 determines if the sample count value is less than or equal to the stop value. When both conditions are true, then AND gate 548 asserts its output select signal (node 550). Thus, the output select signal is only asserted during the interval when the sample count value is between the start value and the stop value.

As thus constructed, blanking circuit 500 operates to pass input samples through for a given interval (curve 608 in FIG. 10). Then, when the blanking period starts, the energy of the input samples is brought down gradually to a zero value or near zero value. The input samples are blanked for a given interval and then the energy of the input samples is brought back up gradually to the ungated level at the start of the next FFT block.

In one embodiment, the window coefficients defining a blanking window used by the blanking circuit are as follows: 0.9985, 0.9880, 0.9658, 0.9441, 0.9187, 0.9056, 0.8761, 0.8061, 0.8346, 0.7901, 0.7137, 0.7041, 0.6003, 0.6921, 0.5408, 0.4489, 0.4912, 0.3906, 0.4275, 0.1939, 0.3614, 0.3281, 0.2068, 0.2291, 0.1206, 0.6516, 0, 0, 0, 0, 0, 0.6516, 0.1206, 0.2291, 0.2068, 0.3281, 0.3614, 0.1939, 0.4275, 0.3906, 0.4912, 0.4489, 0.5408, 0.6921, 0.6003, 0.7041, 0.7137, 0.7901, 0.8346, 0.8061, 0.8761, 0.9056, 0.9187, 0.9441, 0.9658, 0.9880, 0.9985. The first 26 coefficients define the fall interval, the next 5 coefficients define the zero interval and the last 26 coefficients define the rise interval.

In another embodiment, the window coefficients defining a blanking window used by the blanking circuit are as follows: 0.9965, 0.9879, 0.9665, 0.9359, 0.9013, 0.8526, 0.7860, 0.7156, 0.6746, 0.6172, 0.5367, 0.4461, 0.3693, 0.3052, 0.2233, 0.1298, 0, 0, 0, 0, 0, 0, 0, 0, 0, 0.1298, 0.2233, 0.3052, 0.3693, 0.4461, 0.5367, 0.6172, 0.6746, 0.7156, 0.7860, 0.8526, 0.9013, 0.9359, 0.9665, 0.9879, 0.9965. The first 16 coefficients define the fall interval, the next 9 coefficients define the zero interval and the last 16 coefficients define the rise interval.

In the present embodiment, the blanking of the input samples occurs at the end of the FFT block. In other embodiments, the blanking interval can occur at other locations within the FFT block. Furthermore, the fall interval, the rise interval and the zero interval described here is exemplary only. In other embodiments, other values of the fall interval, the rise interval and the zero interval can be used depending on the window profile used.

Those skilled in the art will understand that information and signals may be represented using any of a variety of different technologies and techniques. For example: data, information, signals, bits, samples, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Also, computer instructions/code may be transmitted via signals over physical transmission media from a transmitter to a receiver. For example, if the software is transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method for estimating a feedback channel for a wireless repeater in a wireless communication system, the wireless repeater having a first antenna and a second antenna to receive a receive signal and transmit an amplified signal, the receive signal being a sum of a remote signal to be repeated and a feedback signal resulting from the feedback channel between the first and second antenna of the wireless repeater, the method comprising:

estimating the feedback channel between the first antenna and the second antenna using frequency domain channel estimation and using a signal indicative of the amplified signal as a pilot signal;

grouping samples of the pilot signal into blocks of N samples, N being the size of the fast Fourier transform (FFT) operation performed for the frequency domain channel estimation;

blanking K samples of the pilot signal in each block of N samples, K being much less than N; and generating a feedback channel estimate using blocks of N samples of the pilot signal, each block of N samples including K blanked samples, and blocks of N samples of the receive signal.

2. The method of claim 1, wherein blanking K samples of the pilot signal in each block of N samples comprises reducing an energy level of the K samples of the pilot signal to zero or a value near zero.

3. The method of claim 2, wherein blanking K samples of the pilot signal in each block of N samples comprises reducing the energy level of the K samples of the pilot signal to zero or a value near zero gradually over two or more samples.

4. The method of claim 1, wherein blanking K samples of the pilot signal in each block of N samples comprises applying a window function to blank the K samples of the pilot signal, the window function having a gradual transition from an ungated state to a gated state and vice versa.

5. The method of claim 4, wherein applying a window function to blank the K samples of the pilot signal comprises applying a window function having a fall interval in which an energy level of a first subset of the K samples is reduced from the ungated state to zero or a value near zero, a zero interval in which the energy level of a second subset of the K samples is maintained at zero or a value near zero, and a rise interval in which the energy level of a third subset of the K samples is increased from the zero or the value near zero to the ungated state.

6. The method of claim 5, wherein applying a window function having a fall interval, a zero interval and a rise interval comprises apply a window function where the fall interval and the zero interval are positioned at the end of the block of N samples and the rise interval is positioned at the beginning of the block of N samples.

7. The method of claim 1, wherein blanking K samples of the pilot signal in each block of N samples comprises blanking the K samples of the pilot signal before the fast Fourier transform operation is performed for the frequency domain channel estimation.

8. The method of claim 1, wherein blanking K samples of the pilot signal in each block of N samples comprises replacing the K samples with T samples of a cyclic prefix.

9. The method of claim 1, wherein generating a feedback channel estimate comprises:
generating the feedback channel estimate using blocks of N samples of the pilot signal, each block of N samples including K blanked samples, and blocks of N samples of the receive signal and applying maximal ratio combining.

10. The method of claim 1, wherein estimating the feedback channel using a signal indicative of the amplified signal as a pilot signal comprises:
taking a signal before or after a transmit filter in a transmit circuitry of the wireless repeater as the pilot signal.

11. The method of claim 3, wherein estimating the feedback channel using a signal indicative of the amplified signal as a pilot signal comprises:
taking a signal before or after a transmit filter in a transmit circuitry of the wireless repeater as the pilot signal.

12. The method of claim 4, wherein estimating the feedback channel using a signal indicative of the amplified signal as a pilot signal comprises:
taking a signal before or after a transmit filter in a transmit circuitry of the wireless repeater as the pilot signal.

13. A wireless repeater having a first antenna and a second antenna to receive a receive signal and transmit an amplified signal, the receive signal being a sum of a remote signal to be repeated and a feedback signal resulting from a feedback channel between the first antenna and the second antenna, the repeater comprising:
receive circuitry configured to receive the receive signal from one of the first antenna and the second antenna;
an echo canceller configured to access a feedback signal estimate, and to cancel the feedback signal estimate from the receive signal;
a delay element configured to introduce a first delay before or after the echo canceller; and
transmit circuitry configured to amplify the delayed echo cancelled signal to generate the amplified signal to be transmitted,
wherein the echo canceller comprises:
a channel estimation block configured to estimate the feedback channel using frequency domain channel estimation and using a signal indicative of the amplified signal as a pilot signal, the frequency domain channel estimation operative to perform a fast Fourier transform (FFT) on blocks of N samples of the pilot signal, N being the size of the FFT operation; and
a pilot signal blanking circuit configured to blank K samples of the pilot signal in each block of N samples, K being much less than N,
wherein the channel estimation block is configured to generate a feedback channel estimate using blocks of N samples of the pilot signal, each block of N samples including K blanked samples, and blocks of N samples of the receive signal, the channel estimation block further generates the feedback signal estimate based on the feedback channel estimate.

14. The wireless repeater of claim 13, wherein the echo canceller further comprises a summer to receive the receive signal and the feedback signal estimate, the summer configured to subtract the feedback signal estimate from the receive signal to generate an echo cancelled signal.

15. The wireless repeater of claim 13, wherein the transmit circuitry comprises a transmit filter and the pilot signal blanking circuit blanks the K samples of the pilot signal in each block of N samples before or after the transmit filter.

16. The wireless repeater of claim 13, wherein the pilot signal blanking circuit operative to reduce an energy level of the K samples of the pilot signal to zero or a value near zero to blank the K samples.

17. The wireless repeater of claim 13, wherein the pilot signal blanking circuit operative to reduce an energy level of the K samples of the pilot signal to zero or a value near zero gradually over two or more samples to blank the K samples.

18. The wireless repeater of claim 13, wherein the pilot signal blanking circuit operative to apply a window function to blank the K samples of the pilot signal, the window function having a gradual transition from an ungated state to a gated state and vice versa.

19. The wireless repeater of claim 18, wherein the window function has a fall interval in which an energy level of a first subset of the K samples is reduced from the ungated state to zero or a value near zero, a zero interval in which the energy level of a second subset of the K samples is maintained at zero or a value near zero, and a rise interval in which the energy level of a third subset of the K samples is increased from the zero or the value near zero to the ungated state.

20. The wireless repeater of claim 18, wherein the window function has the fall interval and the zero interval positioned at the end of the block of N samples and the rise interval positioned at the beginning of the block of N samples.

21. The wireless repeater of claim 13, wherein the pilot signal blanking circuit operative to blank the K samples before the fast Fourier transform operation is performed for the frequency domain channel estimation.

22. The wireless repeater of claim 13, wherein the pilot signal blanking circuit operative to replace the K samples with T samples of a cyclic prefix.

23. The wireless repeater of claim 19, wherein the pilot signal blanking circuit comprises:
a blanking controller to generate a fall signal defining a location and a duration of the fall interval and a rise signal defining a location and a duration of the rise interval, the zero interval being position between the fall interval and the rise interval;

an up/down counter to generate a count address in response to the fall signal and the rise signal, the up/down counter being enabled when one of the fall or rise signal is being asserted, the count address counting up from a first count to a last count when the fall signal is asserted and counting down from the last count to the first count when the rise signal is asserted;

a memory to store window coefficients associated with the window function, the memory being indexed by the count address to provide a window coefficient; and a multiplier to multiply each of the K samples with the window coefficient to blank the K samples in accordance with the window function.

24. The wireless repeater of claim 13, wherein the channel estimation block is configured to generate the feedback channel estimate using blocks of N samples of the pilot signal, each block of N samples including K blanked samples, and blocks of N samples of the receive signal and applying maximal ratio combining.

25. The wireless repeater of claim 17, wherein the transmit circuitry comprises a transmit filter and the pilot signal blanking circuit blanks the K samples of the pilot signal in each block of N samples before or after the transmit filter.

26. The wireless repeater of claim 18, wherein the transmit circuitry comprises a transmit filter and the pilot signal blanking circuit blanks the K samples of the pilot signal in each block of N samples before or after the transmit filter.

27. A wireless repeater having a first antenna and a second antenna to receive a receive signal and transmit an amplified signal, the receive signal being a sum of a remote signal to be repeated and a feedback signal resulting from a feedback channel between the first antenna and the second antenna, the repeater comprising:

means for receiving the receive signal from one of the first antenna and the second antenna;

means for cancelling a feedback signal estimate from the input signal;

means for introducing a first delay before or after the feedback signal estimate is cancelled from the input signal;

means for amplifying the delayed echo cancelled signal to generate the amplified signal to be transmitted, wherein the means for cancelling comprises:

means for estimating the feedback channel using frequency domain channel estimation and using a signal indicative of the amplified signal as a pilot signal, the frequency domain channel estimation operative to perform a fast Fourier transform (FFT) on blocks of N samples of the pilot signal, N being the size of the FFT operation; and means for blanking K samples of the pilot signal in each block of N samples, K being much less than N, wherein the means for estimating the feedback channel generates a feedback channel estimate using blocks of N samples of the pilot signal, each block of N samples including K blanked samples, and blocks of N samples of the receive signal, the means for estimating the feedback channel further generates the feedback signal estimate based on the feedback channel estimate.

* * * * *